United States Patent
Ensley et al.

[11] 3,798,003
[45] Mar. 19, 1974

[54] DIFFERENTIAL MICROCALORIMETER

[76] Inventors: E. Keith Ensley, Sherman Hill Estates, Laramie, Wyo. 82070; Henry A. Scholz, Rt. 8, Box 310, Silver City, N. Mex. 88061

[22] Filed: Feb. 14, 1972

[21] Appl. No.: 225,718

[52] U.S. Cl. .................. 23/253 R, 73/15 B, 73/190
[51] Int. Cl. ..................... G01k 17/00, G01n 25/20
[58] Field of Search ........... 23/253 R; 73/15 B, 190

[56] References Cited
UNITED STATES PATENTS

| | | | |
|---|---|---|---|
| 3,059,471 | 10/1962 | Calvet | 73/190 R |
| 3,273,968 | 9/1966 | Benzinger | 23/253 R |
| 3,298,790 | 1/1967 | Benzinger | 73/190 R X |
| 3,505,024 | 4/1970 | Ishimaru | 23/253 R |

*Primary Examiner*—Morris O. Wolk
*Assistant Examiner*—Sidney Marantz
*Attorney, Agent, or Firm*—Horace B. Van Valkenburgh

[57] ABSTRACT

A differential microcalorimeter having a pair of cylindrical thermopiles with a tubular test cell, axially carried within each thermopile. Each thermopile is fitted into an internally cylindrical, externally tapered, longitudinally segmented sleeve. The sleeve is fitted into a tapered well in a heat sink. Pressure against the sleeve to thrust it into the well reduces its diameter to more effectively grip the thermopile. The thermopile is a laminated arrangement of spacers and disk-shaped thermocouple members. Each spacer includes an inner ring gripping the core, an outer ring gripped by the wall of the sleeve and an intermediate insulator washer. Each thermocouple member consists of a disk-shaped insulator about which thermocouple wires are wrapped with the inner edge of the wires being supported upon the inner rings of the spacers and the outer edges supported upon the outer rings thereof. To effectively transmit heat from the core to the inner spacer rings through the wires to the outer spacer rings and to the heat sink, the inner spacer rings are slotted and tightly grip the core of the thermopile. The outer spacer rings are also slotted, and each outer spacer ring is thereby tightly gripped by the sleeve when the sleeve is reduced in diameter regardless of the possibility of variations in the outside diameter of the outer spacer rings. The spacer rings are anodized to insulate them from the thermocouple wires which rest against them.

8 Claims, 10 Drawing Figures

PATENTED MAR 19 1974 3,798,003

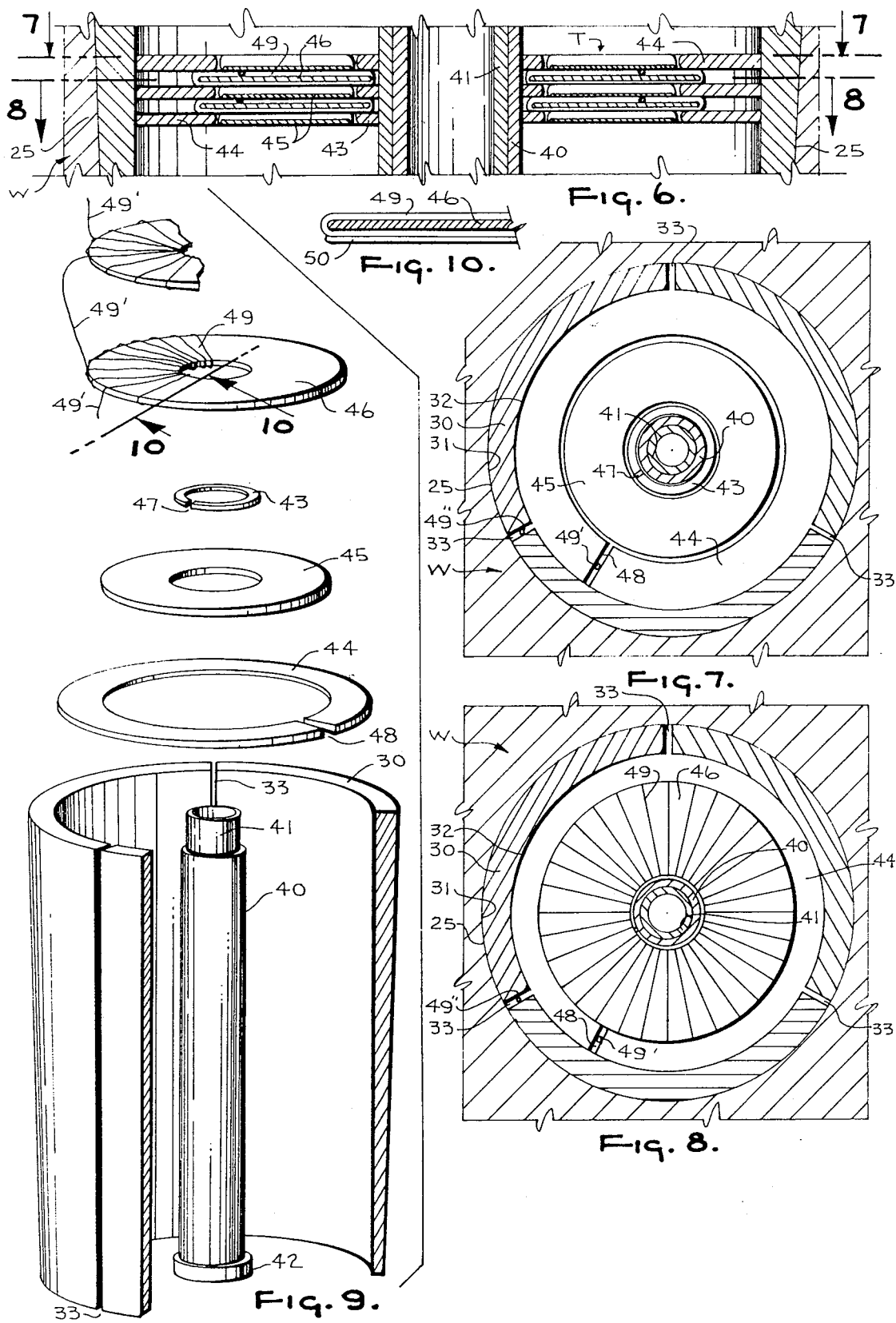

3,798,003

DIFFERENTIAL MICROCALORIMETER

This invention relates to calorimetric measurements wherein the heat involved is of such a small quantity that techniques of microcalorimetry are required, and more particularly to the construction and use of microcalorimeters of the general type known as differential Tian-Calvet calorimeters.

This type of a microcalorimeter uses a solid body of aluminum, forming a heat sink. Two wells are formed within the heat sink body, wherein thermopiles are fitted, and test cells are carried within the thermopiles. The energy which is released as heat within a test cell, as during a chemical or physical reaction, is detected by a thermopile which feeds a signal into a milli-microvoltmeter or like instrument which, in turn, actuates a recorder to produce a curve indicating thermopile and cell structures and the reaction cell may be in one well while the other cell remains empty and serves as a control. Instruments are provided for insertion into the cells to initiate reactions and to calibrate the microcalorimeter, and other features include an oven to retain the heat sink and a temperature control means on the oven to regulate, as precisely as possible, the basic temperature of the heat sink body for any given test.

The present invention is concerned with improvements in the manner in which the heat sink wells, the thermopile structure, and the cells within the thermopile and integrated to produce more positive and reliable results. At the same time, the present invention is concerned with improved and simplified techniques of building a microcalorimeter having a high degree of sensitivity. Accordingly, the objects of the present invention are to provide a novel and improved microcalorimeter which is highly sensitive, which can be quickly and easily calibrated, which produces accurate, reliable measurements which can be used at a wide range of base temperatures as from below zero to as much as 300° to 400° F., and which is a structurally simple, economical, rugged and durable unit.

With the foregoing and other objects in view, my invention comprises certain constructions, combinations and arrangements of parts and elements as hereinafter described, defined in the appended claims and illustrated in the accompanying drawings, in which:

FIG. 6 is a fragmentary sectional portion of the thermopile, the central core and the heat sink about it as shown in FIG. 2, but on a greatly enlarged scale to indicate the arrangement of components therein.

FIG. 7 is a sectional plan view taken along line 7—7 of FIG. 6, but on a reduced scale.

FIG. 8 is a sectional plan view taken along line 8—8 of FIG. 6, but on a reduced scale.

FIG. 9 is an exploded perspective view of the liner sleeve of a heat sink well and of one of each of the components making up the thermopile of the calorimeter unit.

FIG. 10 is a fragmentary, somewhat diagrammatic, sectional detail taken along line 10—10 of FIG. 9, but on an enlarged scale.

Figure 1:
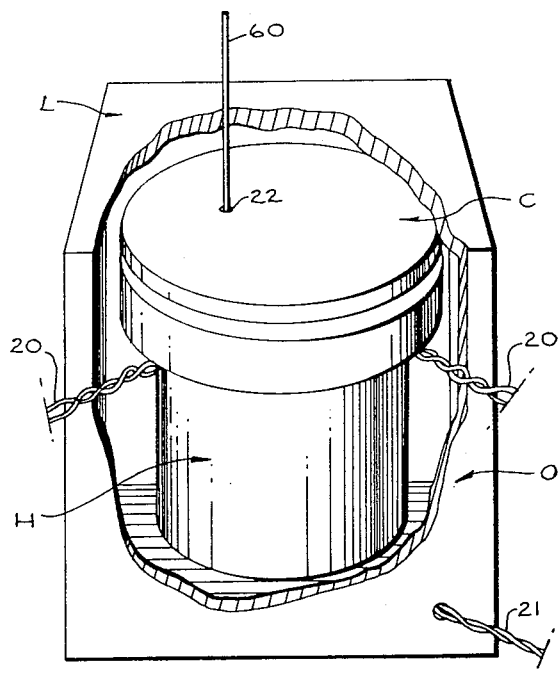
FIG. 1 is a perspective view, with portions broken away, showing the heat sink covered by a cap and housed in a constant temperature oven, indicative of the manner in which the unit is used.

In the present invention, the overall organization is essentially conventional. As set forth at FIG. 1, the body of the unit H functions as, and is commonly referred to as, the heat sink. This body is a block of aluminum, preferably in the form of a square-ended, right cylinder, and is proportioned to accommodate two wells W wherein thermopiles T are placed, as hereinafter described. When the unit is ready for testing, the heat sink H is placed in an oven O which may be a suitable open-top container. Next, a cover C is placed over the heat sink to enclose it, and the oven is closed by a lid L. Various controls and heating means, not shown, are associated with this oven to hold its interior and the heat sink H therein to a selected basic temperature, i.e., the temperature at which a test is to be conducted. To record data obtained from the microcalorimeter, electrical lead wires 20 will extend from the heat sink and from the oven in any suitable manner, not shown. A power input lead 21 is associated with the oven O to regulate the temperature within it, and other passageways such as 22 may extend through the cover C. Similar passageways, not shown, extend through the lid L to permit communication with the test cells so it is possible to physically initiate the desired reaction when the equipment is ready.

Figure 2:
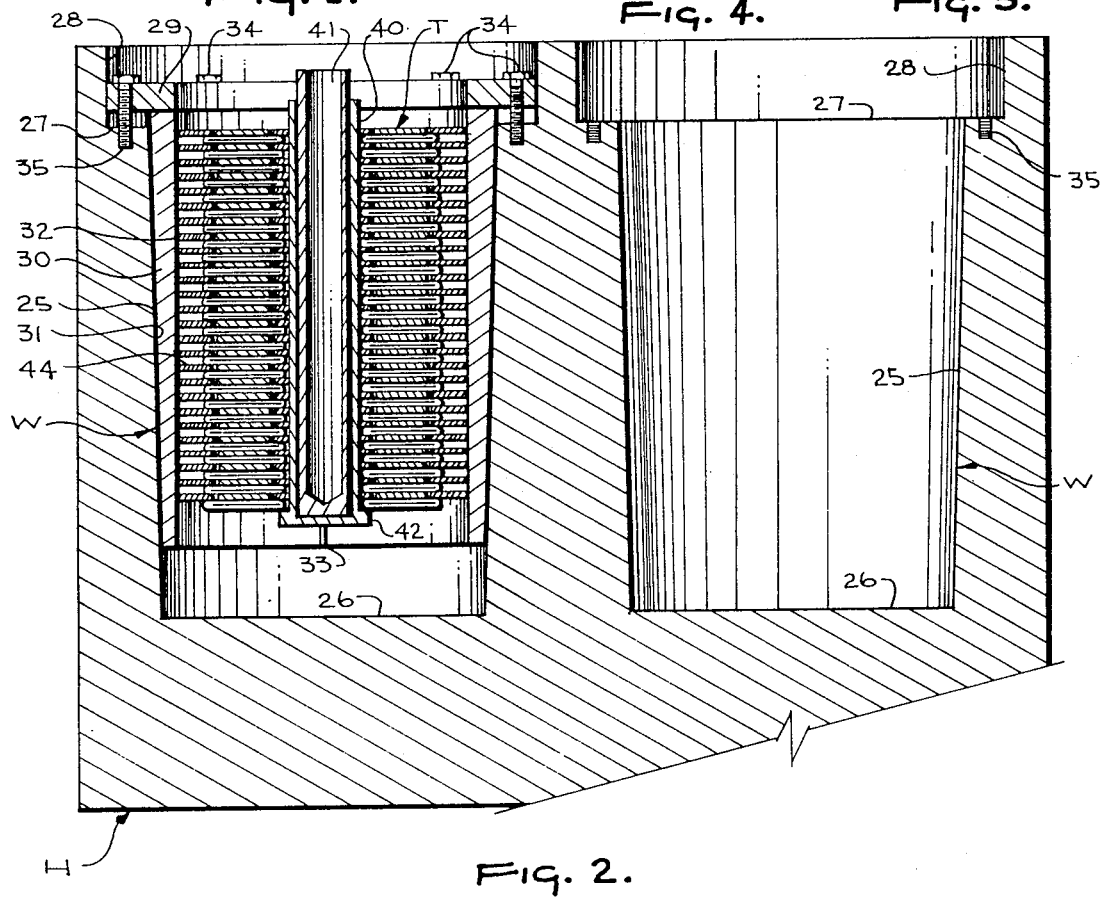
FIG. 2 is a transverse section through the heat sink of the microcalorimeter illustrating the two wells within the body, with one well being empty and the other well having a thermopile mounted therein.

The general arrangement of the wells W in the heat sink H is shown at FIG. 2. While the proportions of this entire organization are not critical, a suitable well size for many tests will be approximately 5 inches in depth by 3¼ inches in upper diameter and 3 inches in lower diameter, to receive thermopiles T of a comparable size, as will be described. Two such wells are provided side by side in the heat sink, and a heat sink of such size has a diameter of 10 to 11 inches and a height of 8 to 9 inches. This size provides adequate material to effectively absorb the heat generated in the wells without measurable fluctuations of temperature.

A thermopile T is formed as a cylindrical laminate of spacing and holding washers and disc-shaped thermocouples as will be hereinafter described, and a first improvement over conventional types of microcalorimeters is to provide a means for more effectively gripping a cylindrical thermopile when it is lowered into a well. Such is essential to provide an efficient heat transfer to the heat sink.

The well W is formed with a tapered, circular wall 25, extending from a minimum diameter at the bottom 26 and to a greater diameter at a shoulder 27 near the top of the heat sink, where an enlarged cylindrical mouth 28 is provided to receive a ring-shaped holding washer 29. A square-ended, tapered circular sleeve 30 is fitted into the well W. The outer wall 31 of the sleeve is tapered to fit the taper of the well, and the inner wall 32 of the sleeve is cylindrical and slightly greater in diameter than the outside diameter of the thermopile T. This sleeve is longitudinally sectioned to provide slots 33.

These slots are illustrated in the drawing, but the sleeve may have more, or less slots and may be unitary with only a single slot. Thus, whenever it is fitted into the well and pushed downwardly against the taper, the slot spacing and the inside diameter of the sleeve will decrease. This will effectively grip a thermopile placed with the sleeve into the well. The holding washer 29 is used to effect this pushing and gripping action by bearing against the top of the sleeve; thus, the inside diameter of the holding washer is slightly greater than the inside diameter of the sleeve so as not to interfere with a lead wire extending from the thermopile through a slot 33 of the sleeve. A ring of bolts 34 extend through holes in the holding washer and into tapped holes 35 in the shoulder 27, and these bolts may be tightened to pull the holding washer tightly against the sleeve and to wedge the sleeve between the tapered wall well and the thermopile.

Figures 3, 4, 5:
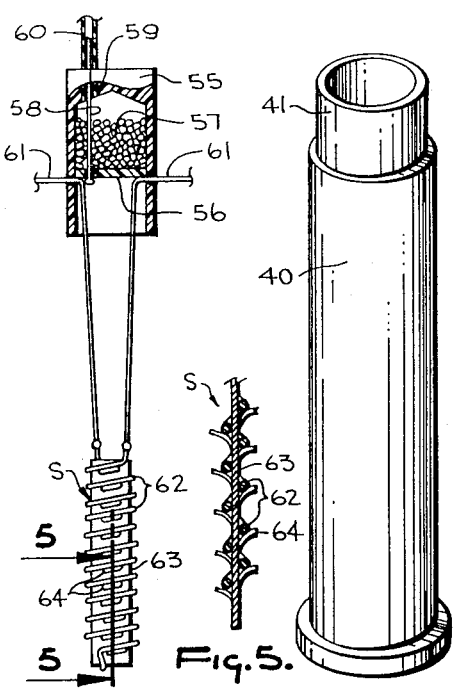
FIG. 3 is a perspective view of the cell holder and cell, as shown in FIG. 2, but on an enlarged scale.
FIG. 4 is an elevational view of a sample holder which includes a resistance coil extending into the reaction cell for calibrating the apparatus.
FIG. 5 is a somewhat-diagrammatic, fragmentary sectional detail as taken from the indicated lines 5—5 at FIG. 4, but on an enlarged scale.

The structural organization of the thermopile includes a central, axially centered, cylindrical core 40, wherein a tubular test cell 41 is snugly fitted as best shown at FIG. 3. The thermopile consists of alternating retention layers and the thermocouple layers placed upon this core 40 and above an enlargement 42 at the bottom of the core, as now described. Each retention layer includes an inner aluminum ring 43, an outer aluminum ring 44 and an insulation disc 45 between them. The thermocouple layers are discs 46 of insulating material which are wire-wrapped as hereinafter described.

To complete the spacer layer, the inner rings 43 are proportioned to fit against the walls of the core 40, and each ring is split, as at 47, to effect a positive, tight fit upon the core 40. The mica insulator discs 45 have an inside diameter proportioned to fit about the inner rings 43 and an outside diameter proportioned to fit within the outer rings 44. The outer rings 44 are proportioned to fit against the inner wall 32 of the sleeve 30, and each ring 44 is split as at radial slot 48 to permit it to vary in diameter and effect a snug, solid contact of the ring within the sleeve 30. The flow of energy, electrical and thermal, from the core of the thermocouple to the heat sink can be accurately measured only if a continuous and solid contact of the several components is maintained, and in the present invention, this is positively attained because the diametrically adjustable sleeve 30 combines with the array of diametrically adjustable outer rings 44, by virtue of respective slots 33 and 48. For example, if through a machining deviation, one ring 44 has a diameter slightly less than the diameter of an adjacent ring 44, the sleeve 30 would, nevertheless, be fitted over both. When the diameter of the sleeve is then decreased by forcing it into the tapered well, it will first grip the larger ring. Because of slot 48, however, the larger ring 44 will decrease in diameter and to the point where the smaller ring 44 is gripped, and such process would continue until all rings 44 in the thermopile are solidly gripped by the sleeve.

The sleeve 30, the core 40, and the inner and outer rings 43 and 44 are of aluminum. This is an ideal material for heat transfer and also ideal because the same are anodized to form insulated oxide surfaces which will transmit heat but will not short out the small voltages generated by the thermocouples. Thus, the thermocouple wires may lay directly upon these anodized surfaces.

The washer-shaped thermocouple discs 46 are formed of mica or a similar insulating material, depending upon the temperatures at which the calorimetric tests are to be made. Each disc has a thermo-responsive wire 49 wrapped about it, and these discs are placed between the retention layers with the wires against the rings 43 and 44. The discs are smaller in diameter than the outside diameter of the rings 44, while the inner, central holes of the discs are larger in diameter than the core 40. Thus, the thermocouple discs 46 provide a small clearance, and each disc 46 is so proportioned as to lie between the inner and outer rings 43 and 44, at each side of it, with the thermocouple wire 49, wrapped about it, being solidly gripped by the several anodized rings.

Each disc is wrapped with a wire 49, from inside to outside, by a series of loops. For example, each disc may have 30 complete, radially directed wraps or loops about the ring-like body of the disc. At the same time, the wire is prepared to produce a thermocouple action. The wire is preferably a commercial type such as 30 gauge constantan wire which is well known for its thermo-responsive actions when coupled with another metal such as copper or silver. A simple mode of producing the bimetallic wire necessary for a thermocouple action is to copper plate or silver plate one side of the wraps of the constantan wire 49. To do this, the other portions of the wrap are masked, as by covering the same with an acetone-soluble glue. Thereafter, an electroplating operation is permitted to proceed in a conventional manner to deposit a layer of copper upon the exposed reaches of the constantan wire wraps. This operation is permitted to continue until the copper layer 50, shown at FIG. 10, is approximately 0.003-inch thick. The result is a large number of thermocouples in a simple, series-connected arrangement.

A number of thermocouple discs 46 are combined to produce the thermopile T with the wire 49 extending from one disc to the next by means of the short wire portion 49' which has a length approximately equal to the thickness of the large aluminum rings 44. For example, in the unit above described, 40 thermocouple discs may be used in the thermopile, and each disc may have thirty wraps of wire 49. When the wire wraps are electroplated, as hereinabove described, a total of 1,200 individual thermocouples will then be produced. The continuous wire 49 will include connective portions 49' between the adjacent discs and when the thermopile is assembled, with the disc between the spacer components, these wire portions 49' may extend from one disc to the other and will pass through the outer ring slots 48 as indicated at FIGS. 7 and 8. Also, the lead wire 49" from the bottom of the thermopile may extend upwardly to the top thereof through the passageway formed by a slot 33 of the sleeve for connection with a lead wire 20, as shown at FIGS. 7 and 8.

An important use of the microcalorimeter is to determine the heat which is released when an asphalt adheres to an aggregate. To make such a test, the tubular test cell 41 is partially filled with asphalt and the aggregate is thereafter dropped into the asphalt. Accordingly, it is necessary to provide a means for dropping the aggregate into the liquid asphalt in the test cell 41 in a manner which will not cause any temperature change in the asphalt except that caused by the reaction. Also, because of the exceeding delicacy of the minute measurements, it is necessary to provide a means for calibrating the apparatus based upon a measured addition of heat to the asphalt, of the same order as the reaction. These two requirements are met by a combined sample holder and calibration resistance coil S, shown at FIG. 4. This holder unit is fitted onto the top of the reaction cell at the commencement of a test.

The sample holder S is formed as an inverted cup 55 having an internal diameter sufficiently large as to telescopically fit over the end of the test cell 41. The cup is preferably formed of a stable plastic material such as Teflon. A plastic disc 56, also of Teflon, is snugly fitted in this cup-shaped sample holder, about one-third the distance from the bottom, to hold a charge of aggregate 57 within the upper portion of the cup. The aggregate will be of a carefully selected size, such as that between 30-mesh and 40-mesh, so that the total surface area of the sample can be estimated with a reasonable degree of precision, and one sample will be comparable with another.

Release of the aggregate from the sample holder is effected by tipping the disc 56. A trip wire 58 is connected to one side of the disc 56, and this wire extends upwardly through a passageway 59 in the top of the holder S and thence upwardly and through the passageway 22 in the cover C of the unit. To better heat insulate the wire 58, it is fitted within a plastic tubing 60 of a type which is commonly referred to as spaghetti tubing. The wire is simply pulled to tip the disc and drop the aggregate.

A calibration coil is associated with the sample holder S, for which lead wires 61 depend from each side of the interior of the cup 55 and extend downwardly therefrom to carry a vertically extended, flatly wound resistance coil 62 having a length such that it will be immersed into the test cell 41. This resistance coil is of small diameter Nichrome wire or of a similar high-resistance wire, and it is wound about a flat mica core 63 characterized by having small projections or shelves 64 of mica outstanding from each side thereof at each coil wrap, as illustrated at FIG. 5. The purpose of these shelves is to facilitate tumbling and mixing of the aggregate in the sample holder thereabove as it is dropped into the charge of liquid asphalt within the test cell 41.

In using this apparatus, the thermopile in one of the cells will serve as a base unit while the heat reaction test will be conducted in the other. The test cell 41 is filled with a selected charge of liquid asphalt, the sample holder S is charged with aggregate 57, and the unit is placed upon the test cell 41 with the resistance coil immersed in the asphalt. The remainder of the microcalorimeter has been in the oven to attain a desired heat level when the test cell and sample holder are placed therein. When the asphalt and the aggregate reach the same temperature, which may require 24 to 72 hours, i.e., whenever the temperature of the unit has stabilized, the test may be initiated by pulling the wire 58 to tip the disc 56 and drop the aggregate charge into the test cell. As this aggregate is dispersed within the asphalt in the cell, with the help of the mica shelves 64, a small rise of temperature will occur. This temperature increase will be transmitted to the thermopile to produce a voltage which can be recorded for a time period sufficient to obtain a suitable curve showing the relation between the temperature and time.

A calibration of the apparatus may be made before and/or after each test is made by passing an electric current through the resistance coil 62. This measured current flow will produce a small but equivalent amount of heat in the asphalt, and the heat will be sensed by the thermopile and recorded in the same manner as above described, for comparison with the heat produced by the immersion of the aggregate in the asphalt. In this manner, the heat generated by the adhesion action of the aggregate in the asphalt can be precisely measured.

It will be understood that small amounts of heat generated by other physical, or by chemical reaction or electrical phenomenon, may be measured in the same way.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

What is claimed is:

1. In a differential microcalorimeter of the type which is fitted into the well of a heat sink body, said well being circular in section and tapering from a minimum diameter at the bottom to a larger diameter at the mouth, and said microcalorimeter includes:
   a. a reaction cell formed as an elongated, cup-like open top member within a cylindrical core;
   b. a cylindrical thermopile having an axially centered passageway to receive the reaction cell, and which is formed as an array of flat, washer-shaped thermocouple members spaced between an array of inner spacer rings and outer spacer rings with the inner spacer rings tightly fitting about the reaction cell core wall to hold the array together;
   c. a tube-like segmented sleeve with at least one longitudinal segment space therein and having an outer surface corresponding with the tapered well to fit therein and a cylindrical inner surface having a diameter which snugly receives the aforesaid outer spacer rings, whereby with the thermopile within the sleeve and the sleeve within the well, a down-ward pressure against the sleeve therein effects a reduction of diameter to compress the sleeve against the outer spacer rings of the thermopile;
and wherein:
   each of the outer spacer rings is split to provide a small gap to individually yield when the sleeve is compressed against the rings whereby the sleeve will tightly grip each and all of the outer rings, with a substantially uniform pressure.

2. In the microcalorimeter defined in claim 1, wherein:
   the inner rings are split so that each may bear against the core wall with a substantially uniform pressure.

3. In the microcalorimeter defined in claim 2, wherein the thermocouple members comprise:
   washers of insulating material having an inside diameter slightly greater than the inside diameter of the inner rings and an outside diameter slightly less than the outside diameter of the outer rings, whereby each washer is supported upon shoulders formed by the adjacent rings.

4. In the microcalorimeter defined in claim 3, wherein each thermocouple washer includes:
   wrappings of thermocouple wire about the washer, with one side presenting a metallic surface differing from the metallic surface of the other side.

5. In the microcalorimeter defined in claim 1, wherein:
   the reaction cell is extended substantially the length of the thermopile; and
   a charge means at the top of the cell adapted to drop materials into the cell for carrying out measurements.

6. In the microcalorimeter defined in claim 5, including:
   a stepped member within the reaction cell adapted to facilitate stirring the charge as it drops into the reaction cell.

7. In the microcalorimeter defined in claim 5, wherein:
   the charge means is a cylindrical, end-closed member having an open end which fits over the opening of the reaction cell.

8. In the microcalorimeter defined in claim 7, including:
   a diaphragm within the charge-means cup adapted to retain a charge of material at the top portion of the cup when it is fitted upon the reaction cell; and
   means to disrupt the diaphragm to permit the same to drop the charge into the reaction cell.

* * * * *